United States Patent [19]

Greenley

[11] Patent Number: 5,000,618
[45] Date of Patent: Mar. 19, 1991

[54] METHOD TO PREVENT CLOGGING OF GEOTEXTILES AND GEONETS

[75] Inventor: David E. Greenley, Blue Bell, Pa.

[73] Assignee: Rohm and Haas Company

[21] Appl. No.: 334,263

[22] Filed: Apr. 6, 1989

[51] Int. Cl.⁵ .......................... E02B 3/16; B09B 5/00
[52] U.S. Cl. .................................. 405/128; 210/501; 210/764; 424/404; 405/36; 405/129
[58] Field of Search ................. 405/128, 129, 43, 45, 405/36; 210/501, 764; 424/404, 403, 411, 405

[56] References Cited

U.S. PATENT DOCUMENTS

| | | | |
|---|---|---|---|
| 2,468,068 | 4/1949 | Horsey | 424/404 X |
| 3,161,622 | 12/1964 | Harrington et al. | 424/404 X |
| 3,523,121 | 8/1970 | Lewis et al. | |
| 3,761,488 | 9/1973 | Lewis et al. | |
| 3,775,224 | 11/1973 | Gentile et al. | |
| 3,862,030 | 1/1975 | Goldberg | 210/501 X |
| 3,936,380 | 2/1976 | Boske | 405/45 X |
| 4,016,080 | 4/1977 | Williams | 210/501 |
| 4,032,457 | 6/1977 | Matchett | 210/501 X |
| 4,071,636 | 1/1978 | Nishino et al. | 210/501 X |
| 4,105,431 | 8/1978 | Lewis et al. | |
| 4,483,771 | 11/1984 | Koch | 210/501 X |
| 4,601,831 | 7/1986 | Cook | 210/501 X |
| 4,644,021 | 2/1987 | Toda et al. | |
| 4,696,599 | 9/1987 | Rokoczynski et al. | 405/129 |
| 4,725,624 | 2/1988 | Whitekettle et al. | 210/764 X |
| 4,753,551 | 6/1988 | Brueggemann et al. | 405/128 |
| 4,768,897 | 9/1988 | Nussbaumer et al. | 405/128 |
| 4,810,131 | 3/1989 | Turney | 405/129 |

*Primary Examiner*—Dennis L. Taylor

[57] ABSTRACT

A process for preventing biological fouling and/or clogging of a geotextile used in a landfill leachate collection system comprising distributing chunks of biocide-containing material on the geotextile, and a landfill having a leachate collection system comprising a geotextile having chunks of biocide-containing material distributed on the geotextile.

14 Claims, No Drawings

METHOD TO PREVENT CLOGGING OF GEOTEXTILES AND GEONETS

BACKGROUND OF THE INVENTION

1. Field of the Invention

This invention relates to leachate collection systems used in landfills.

2. Description of the Prior Art

A relatively new method for constructing landfills so as to minimize the potential for contamination of the surrounding environment is through use of a leachate containment and collection system. Following excavation of the landfill, an impermeable membrane, often referred to as a geomembrane, is placed in the hole. Good practice stipulates, however, that in addition to containment of the landfill, the leachate, or liquid that drains from the waste, must be collected. This is accomplished by placing a geonet over the geomembrane. As the leachate drains from the landfill, it collects in the geonet and flows to central collection points where is can be pumped to the surface either for treatment or recirculation. If left exposed, the geonet would become clogged in a very short period of time by solids from the landfill. To prevent this, a layer referred to as the geotextile is placed over the geonet. The geotextile can be either a woven or non-woven polypropylene, polyester, or polyethylene mat. There are many variations possible, including multiple layers of geomembranes, nets, textiles, gravel beds and drain pipes. The leachate flow should be maintained over the life of the landfill, which can be 30 years or longer. If the leachate flow falls below a specified volume, the system is generally regarded as clogged and, at great expense, the clogged system must be excavated, unclogged, and replaced.

A significant cause of clogging in leachate collection systems is due to the growth of microorganisms in and on the geotextiles and geonets. This condition is described in detail in a paper by G. R. Koerner and R. M. Koerner entitled "Biological Clogging in Leachate Collection Systems," which appeared in the proceeding of a Seminar on the Durability and Aging of Geosynthetics, Drexel University, Dec. 8-9, 1988. Others have suggested that an antimicrobial agent be impregnated into the plastic making up the geotextile or geonet. However, that method is insufficient to exert a significant, long lived, antimicrobial effect on the geonet or geotextile, resulting in undesirable biological fouling and shortening the useful life of the landfill.

SUMMARY OF THE INVENTION

It is an object of the present invention to provide a method for preventing the clogging of geotextiles and geonets used in leachate collection systems.

A further object of the invention is to provide a method for preventing the biological fouling of textiles used underground.

A still further object of the invention is to provide a landfill design with a leachate collection system which is operable over exceptionally long periods and is resistant to fouling due to biological clogging of the porosity of the textiles used in the system.

These objects, and others as will become apparent from the following disclosure, are achieved by the present invention which, in one aspect, comprises a method which comprises distributing chunks of biocide containing material on the geotextile used in the landfill. Another aspect of the invention is a landfill leachate collection system comprising a geotextile which has chunks of biocide containing material distributed on the geotextile.

DETAILED DESCRIPTION OF THE INVENTION AND THE PREFERRED EMBODIMENT

The chunks of biocide-containing material comprise a biocide, sometimes referred to as an antimicrobial agent, in solid or semi-solid form. The chunks are in regular or irregular form as pieces, granules, pellets or briquettes. The chunks are distributed over the surface of the layer requiring protection from microbial clogging, usually the geotextile. As the leachate drains through the landfill, the antimicrobial leaches from the solid chunks, and exerts an antimicrobial effect on the surrounding surface.

Different biocides (antimicrobial agents) can be combined to provide a range of effects. For example, a highly water soluble material can be used in combination with a low water soluble material. The advantage of this combination would be that before the landfill is capped, a high level of water enters the landfill as rain. This high flow period would dissolve the highly water soluble material more rapidly than the less water soluble material. The highly water soluble material would provide protection during this period. Once the landfill is capped, the flow of water decreases. At this time the low water soluble compound would then slowly dissolve, providing the needed long term protection. This effect could also be obtained by formulating a single antimicrobial agent in two ways such that the release rates would be high during the high water flow period and low during the low water flow period. The duration of protection from microbial growth and clogging could be regulated by altering the size of the pieces, the formulations of the pieces, by selecting antimicrobial agents with a range of water solubilities, and by the distribution (number of pieces applied per square yard of surface) of the pieces over the surface to be protected.

There are a wide variety of ways to make the chunks of biocide-containing material. One way is to use solid pieces of the desired biocide, i.e., antimicrobial agent, assuming that the biocide is solid at ambient temperatures. Another way is to formulate the desired antimicrobial agent into a plasticizer as described in U.S. Pat. No. 3,775,224. An alternative way is to form an inclusion compound with cyclodextrins, or with clathrates as described in U.S. Pat. No. 4,644,021. Similarly, the antimicrobial compound can be spray dried onto various solid materials, absorbed onto various solid materials such as diatomaceous earth, pelletized, mixed with high melting point surfactants, encapsulated, or mixed with other materials that could be used to formulate a liquid antimicrobial agent into a solid or semi-solid form. Techniques to make solid form biocides which are used in the fields of agricultural products formulation and the formulation of pharmaceuticals can also be used.

According to the present invention, clogging of geotextiles and geonets used in leachate collection systems which is caused by the growth of microorganisms can be controlled. The method involves the use of chunks of biocide-containing material, i.e., solid granules, or briquettes containing appropriate antimicrobial compound or compounds.

The chunks are distributed over the surface of the geotextile prior to the addition of waste to the landfill. As the leachate drains from the landfill into the leachate collection system, said antimicrobial compounds will leach from the said granules, chunks or briquettes and exert an antimicrobial effect on the surface of geotextile thereby controlling microbial growth and preventing the clogging of the geotextile caused by microorganisms, and resultant clogging of the leachate collection system and disablement of the landfill itself.

Many antimicrobial agents are suitable or could be formulated so as to become suitable for use in this invention. Specific antimicrobial agents that may be used in this invention include, but are not limited to, the following:

1. Isothiazolones as described in U.S. Pat. Nos. 3,523,121; 3,761,488; and 4,105,431;
2. bis(tri-n-butyl tin) oxide;
3. 10, 10'-oxybisphenoxarsine and other phenoxarsine and phenarazine compounds;
4. N-(2-methylnaphthyl) maleimide and other antimicrobial maleimides;
5. Metal soaps such as copper naphthenate and zinc naphthenate;
6. Copper-8-hydroxy quinolinolate;
7. Metal dimethyl dithio carbamates;
8. Phenylmercuric acetate;
9. Various antimicrobial phenolics such as phenol; o-phenyl phenol; and various halogenated phenolics such as penta-chlorophenol;
10. Triazine compounds such as hexahydro-1,3,5-triethyl-s-triazine;
11. Beta- Bromo-beta-nitrostyrene;
12. 1,2-Benzisothiazolin-3-one;
13. Glutaraldehyde;
14. Quaternary ammonium compounds such as alkyl dimethyl benzyl ammonium chloride;
15. Tetrachloroisophthalonitrile;
16. 1,2-dibromo-2,4-dicyanobutane;
17. Methylene bis-thiocyanate;
18. 2-bromo-2nitropropane-1,3-diol;
19. 3-iodo-2-propynyl butyl carbamate;
20. 2-(thiocyanomethylthio) benzothiazole; and
21. Diiodomethyl-p-tolyl sulfone;

EXAMPLE 4,5-dichloro-2-cyclohexyl-3-isothiazolone, a solid at room temperature, having a melting point of 113–115 degrees centigrade, was melted and then cast into small blocks measuring 5.0×5.0×2.0 centimeters. The blocks were placed on the surface of a non-woven, needle perforated polypropylene geotextile having the following characteristics:

Thickness: 2.2 millimeters;
Density: 280 grams per square meter;
Apparent Opening size: 70–100 (U.S. sieve number);

Water was passed through the geotextile, slowly dissolving the blocks. The solubility of the antimicrobial agent was determined to be 43 parts per million. It was demonstrated in a separate experiment that this antimicrobial agent inhibits the growth of bacteria and fungi at approximately 20 parts per million. As the block dissolves, it releases the antimicrobial agent in sufficient concentration to maintain a zone surrounding the block which is free of microbial contamination. A block of this material and of this size would weigh approximately 70 grams. With a water solubility of 43 parts per million it would require approximately 1.6 million grams of water to dissolve the block. If the blocks were distributed one per each square foot of geotextile surface, it would take over 15 years of rainfall at 35 inches per year to dissolve the block. It is clear to see how this concept can provide a long duration of antimicrobial activity.

What is claimed is:

1. A process for preventing biological fouling and or clogging of a geotextile used in a landfill leachate collection system comprising placing a geotextile in a landfill distributing chunks of biocide-containing material on the geotextile so as to exert an antimicrobial effect on the surface of geotextile and prevent clogging of the geotextile by microorganisms, said geotextile having pores of a size adapted to permit liquid leachate to drain through but to prevent small particle fines from passing through.

2. Process of claim 1 wherein the chunks of biocide-containing material are in solid form adapted to release biocide over a period of at least 5 years.

3. Process of claim 1 wherein said biocide is in the form of a clathrate compound.

4. Process of claim 1 wherein said biocide is encapsulated.

5. Process of claim 1 wherein said biocide is present in a resin.

6. Process of claim 1 wherein said biocide is in a cyclodextrin.

7. In a landfill having a leachate collection system comprising a geotextile, the improvement comprising having on the geotextile chunks of biocide-containing material so as to exert an antimicrobial effect on the surface of the geotextile and prevent clogging of the geotextile by microorganisms, said geotextile having pores of a size adapted to permit liquid leachate to drain through but prevent small particle fines from passing through.

8. Landfill of claim 7 wherein the material is in solid form adapted to release biocide over a period of at least 5 years.

9. Landfill of claim 7 wherein said biocide is in the form of a clathrate compound.

10. Landfill of claim 7 wherein said biocide is encapsulated.

11. Landfill of claim 7 wherein said biocide is present in a resin.

12. Landfill of claim 7 wherein said biocide is in a cyclodextrin.

13. Landfill of claim 7 wherein said chunks are in pellet or granular form having a diameter greater that the pore size of the geotextile.

14. Landfill of claim 7 wherein the biocide is selected from the group consisting of isothiazolones; 2-bis(tri-n-butyl tin) oxide; 10, 10'-oxybisphenoxarsine; N-(2-methylnaphthyl) maleimide; copper naphthenate and zinc naphthenate;. copper-8-hydroxy quinolinolate; metal dimethyl dithio carbamates; Phenylmercuric acetate; phenol; o-phenyl phenol; penta-chlorophenol; hexahydro-1,3,5-triethyl-s-triazine; beta-bromo-beta-nitrostyrene; 1,2-benzisothiazolin-3-one; glutaraldehyde; alkyl dimethyl benzyl ammonium chloride; tetrachloroisophthalonitrile; 1,2-dibromo-2,4-dicyanobutane; methylene bis-thiocyanate; 2-bromo-2-nitropropane-1,3-diol; 3-iodo-2-propynyl butyl carbamate; 2-(thiocyanomethylthio) benzothiazole; and diiodomethyl-p-tolyl sulfone.

* * * * *